March 11, 1969     J. R. ROBERTSON     3,432,583
METHOD OF MOULDING
Filed May 13, 1965

INVENTOR.
JOHN R. ROBERTSON
BY Charles A. Blank
ATTORNEY

United States Patent Office 3,432,583
Patented Mar. 11, 1969

3,432,583
METHOD OF MOULDING
John R. Robertson, Currie, Midlothian, Scotland, assignor to Uniroyal Limited, a corporation of Scotland
Filed May 13, 1965, Ser. No. 455,628
U.S. Cl. 264—46
Int. Cl. B29h 7/20; B29d 17/00
3 Claims

ABSTRACT OF THE DISCLOSURE

The invention relates to a method of moulding plastic materials or the like to form articles, for example, seat cushions having high density hard surfaces at the front and side portions therof and having softer central portions. A pre-cured foam sheet material may be utilized to line the front and side portions of the mould, only the edges of the sheet being sealed against leakage of subsequently applied liquid foam around the edges of the sheet to the outer surfaces of the sheet. Liquid ingredients for foam are poured into the central portion of the mould, foam and penetrate the pre-cured foam sheet, and in the central portion of the mould form liquid foam which is then cured.

---

This invention relates to the moulding of plastics or rubbery materials in a liquid or semi-liquid foamed condition with a view to providing a compressible moulded foam such as for example a cushion or upholstery filling.

It has in the past proved difficult to prepare such a moulding having a desirable density distribution and especially having a relatively high density hard surface and a softer interior. To provide different hardness in various parts of a cushion or upholstery filling is particularly desirable for example in the case of motor car seats where a soft centre is considered an advantage from the point of view of general comfort.

The invention consist in a method of moulding a foam of the kind referred to in which the plastics or rubbery material in a foaming or foamed condition is cured in a mould containing at predisposed positions, portions of preformed permeable filler capable of being impregnated at least partially by the plastics or rubbery material to be cured.

In one arrangement, the filler is constituted by pre-cured foam of the same chemical character as that which is to be moulded. Alternatively, moulded foam of a different character may be employed, or even fibrous mat such as that sold under the trade name "Hairlock."

Where, as will generally be the case, some of the filler is to be located at the side or bottom of the mould, it is preferred that it be secured in position in such a manner as to prevent or reduce the direct access of the foam to the outer face of the filler.

The invention has particular reference to the moulding of polyurethane foams.

Referring now to the drawings, FIG. 1 is a plan view of a mould with its lid removed for making a seat cushion in accordance with the invention;

Figure 1:
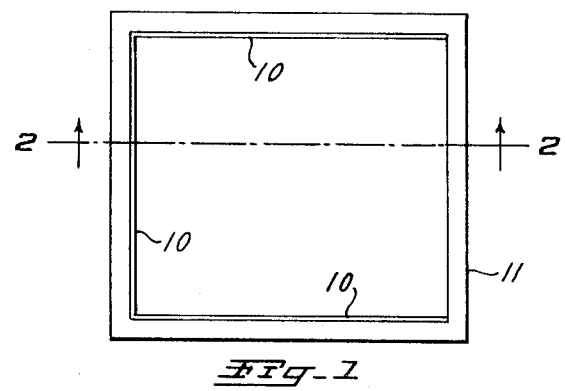
Figure 2:
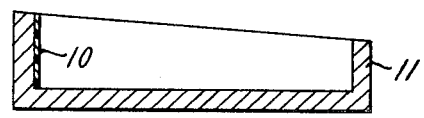
FIG. 2 is a view, in section, of the mould taken along line 2—2 of FIG. 1.
Figure 3:
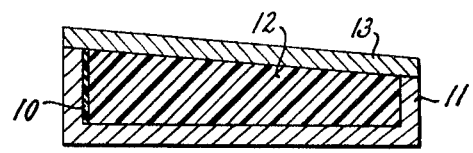
FIG. 3 is a sectional view of the mould of FIG. 1 with the lid in place and with the foam materials formed therein.

In an example, a cushion mould is lined along its side and front panels by a sheet of polyurethane foam of a thickness of the order of ¼". This foam may be based upon a polyester or a polyether and may have a density of for example 1.5–2 lbs. per cubic foot. 1.7 lbs. per cubic foot is a particularly suitable density. Referring to FIGS. 1 and 2, the foam 10 is cut to an appropriate size for covering the front and side panels of the mould 11 to leave an area in the centre of the mould free of the sheet. The edges of the sheet are then sealed in position by any convenient method such as the use of masking tape or of a weak adhesive. The liquid ingredients for the moulded polyurethane foam are then mixed and poured into the cushion mould, the moulding then being carried out in the normal way to form a foam material 12 in the central portion of the mould 11 which is represented in FIG. 3 with its lid 13 in place. The liquid ingredients foam in situ, but at the same time the liquid constituents of the foam penetrate the preformed polyurethane foam sheet. Because this sheet is sealed at its edge, the penetration of the preformed foam is from the inside only, so that in the resulting cushion the filler inserts are located at the outer face of the cushion. The sheet may be completely impregnated, or the impregnation may extend only part way through the thickness thereof. In either case, the cushion has a relatively hard high density surface region which is particularly suitable for motor car seats.

Having thus described my invention, what I claim and desire to protect by Letters Patent is:

1. The method of making a foam cushion having substantially different foam compression values throughout the body thereof comprising the steps of: lining a cushion mould along its side and front portions with sheet foam of substantial thickness; sealing only the edges of said sheet foam against leakage of subsequently applied liquid foam at the edges of said sheet foam; pouring liquid ingredients for foam into the portion of said mould not occupied by said sheet foam; said liquid ingredients foaming and penetrating said sheet foam; and curing the liquid foam.

2. The method of claim 1 wherein said sheet foam has a density of 1.5 to 2.0 pounds per cubic foot.

3. The method of claim 2 wherein said sheet foam has a thickness in the order of ¼".

References Cited

UNITED STATES PATENTS 2,927,876   3/1960   Hoppe et al. _____ 264—46 XR
2,993,233   7/1961   Hoppe et al. _____ 264—46

JULIUS FROME, Primary Examiner.

LEON M. GARRETT, Assistant Examiner.

U.S. Cl. X.R.

264—45, 51